(12) United States Patent
Ono et al.

(10) Patent No.: US 6,607,281 B2
(45) Date of Patent: Aug. 19, 2003

(54) LIGHT GUIDE PLATE, SIDELIGHT TYPE LIGHT SOURCE DEVICE AND IMAGE DISPLAY DEVICE

(75) Inventors: Masaki Ono, Sagamihara (JP);
Fumitoshi Kiyooka, Yamato (JP);
Yoshihiro Katsu, Sagamihara (JP);
Mikio Suzuki, Fujisawa (JP);
Takaharu Tsugane, Tokyo (JP)

(73) Assignees: International Business Machines Corporation, Armonk, NY (US);
International Manufacturing and Engineering Services Co., Ltd., Kanagawa-Ken (JP)

( * ) Notice: Subject to any disclaimer, the term of this patent is extended or adjusted under 35 U.S.C. 154(b) by 36 days.

(21) Appl. No.: 09/919,773

(22) Filed: Aug. 1, 2001

(65) Prior Publication Data

US 2002/0044438 A1 Apr. 18, 2002

(30) Foreign Application Priority Data

Aug. 8, 2000 (JP) .......................................... 2000-239779

(51) Int. Cl.$^7$ ................................................. F21V 7/04
(52) U.S. Cl. ............................. 362/31; 362/26; 362/330
(58) Field of Search ........................... 362/26, 31, 558, 362/331, 330, 561; 349/65; 385/146

(56) References Cited

U.S. PATENT DOCUMENTS

| 5,377,083 A | * | 12/1994 | Tada | 362/31 |
| 5,414,598 A | * | 5/1995 | Anderson | 362/26 |
| 5,651,086 A | * | 7/1997 | Russell | 385/146 |
| 6,406,160 B1 | * | 6/2002 | Itoh | 362/31 |
| 6,412,969 B1 | * | 7/2002 | Torihara et al. | 362/31 |

FOREIGN PATENT DOCUMENTS

| JP | 63033702 | 2/1988 |
| JP | 06317796 | 11/1994 |
| JP | 09231822 | 9/1997 |

* cited by examiner

*Primary Examiner*—Y. My Quach-Lee
*Assistant Examiner*—Peggy A Neils
(74) *Attorney, Agent, or Firm*—Darby & Darby

(57) ABSTRACT

A sidelight type light source device increases the quantity of light in a corner portion of a light guide plate at low cost while meeting a demand for picture frame narrowing. An incident surface receives light from a stick-shaped light source. The incident surface includes a first incident surface its center a pair or second incident surfaces at the ends of the first incident surface. The second incident surfaces are formed on a corner portion in a width direction of the light guide plate. The second incident surfaces are set back from the first incident surface taken as a reference. Accordingly, a light introducing route is defined between the second incident surface and rubber blocks at the ends of a fluorescent light source. Light from the fluorescent lamp passes along the light introducing route where it is directly incident on the second incident surfaces of the light guide plate.

12 Claims, 16 Drawing Sheets

LIGHT GUIDE PLATE, SIDELIGHT TYPE LIGHT SOURCE DEVICE AND IMAGE DISPLAY DEVICE

BACKGROUND OF THE INVENTION

The present invention relates to a sidelight type light source device and an image display device using the sidelight type light source device.

Liquid crystal display devices are widely used as image display devices for personal computers and other types of monitors. In general, a liquid crystal display device has a backlight for providing a planar light source for illumination. The backlight is disposed on a rear surface of a liquid crystal display panel. The backlight irradiates the rear of the liquid crystal surface in a manner that the liquid crystal surface, having a specified expansion, has a uniform brightness over its surface, thus uniformly displaying an image in the liquid crystal. For the backlight described above, a fluorescent lamp is generally used as the stick-shaped light source. The fluorescent lamp may be a hot cathode or cold cathode type. The fluorescent lamp provides a linear stick-shaped light source. The light from the fluorescent lamp must irradiate the entire surface of the liquid crystal display panel. Two types of the backlights have been used in the prior art. The two types include a direct backlight and a side backlight (edge light).

The direct backlight includes a fluorescent lamp under a liquid crystal display panel with a dimmer plate and a diffusion plate on the fluorescent lamp.

The side backlight places a fluorescent lamp along one or both sides of a light guide plate made of a transparent resin. Light incident on the light guide plate is directed in the direction of the liquid crystal display panel surface by a reflecting unit produced by processing a back surface of the light guide plate. The processing produces light diffusion which directs uniform planar light over the liquid crystal display panel. The side backlight is suitable for a display device in portable equipment such as a notebook personal computer because it can be thinner compared with a display device using direct backlight.

Notebook personal computers continue to progress in reduction of thickness and weight in order to enhance portability. As a consequence, the weight and thickness of liquid crystal display devices, including their backlight, must also be reduced.

Technology has been developed for thinning the light guide plate, which is a principal constituent component of the backlight. This technology continues to satisfy the functions of the light guide plate. Currently, light guide plates having a thickness of about 2 to 3 mm are available. Light guide plates conventionally use acrylic resin which has excellent light transmittance. A typical acrylic resin in this application is, for example, polymethylmethacrylate. Polymethylmethacrylate has a refractive index of 1.49 and a critical reflection angle: 42 degree.

The linear-source fluorescent lamp is disposed along an incident surface of the light guide plate in a body called a reflector which guides light from the fluorescent lamp to the light guide plate efficiently.

Referring to FIGS. 9 and 10, a light guide plate 1 includes an incident surface 1a, a light-emitting surface 1b and a reflection surface 1c. A fluorescent lamp 2 is disposed along the incident surface 1a. A reflector 3 surrounds the fluorescent lamp 2. Rubber blocks 4 made of, for example, silicon rubber, are attached to both ends of the fluorescent lamp 2. Due to the presence of the rubber blocks, the light source includes a light-emitting portion denoted by EA in FIG. 10 and non-light-emitting portions which are the portions covered by the rubber blocks 4. The rubber blocks 4 are disposed in contact with the incident surface 1a of the light guide plate 1. The rubber blocks 4 protect electrodes (not shown) at the ends of the fluorescent lamp 2, and prevent heat from the fluorescent lamp 2, which may rise to about 100 centigrade, from being conducted directly to the light guide plate 1. A high voltage, ranging from several hundred volts to more than a thousand volts, is applied to the electrodes during the operation. The rubber blocks 4 insulate this high voltage.

The light irradiated from the fluorescent lamp 2 is incident on the incident surface 1a of the light guide plate 1. The incident light travels through the light guide plate 1 without leakage to the outside because it meets all of the reflection conditions in the light-emitting surface 1b and the reflection surface 1c of the light guide plate 1 according to Snell's law. However, as seen with reference to FIG. 10, the end portions (corner portions) in the width direction of the sides of the light guide plate 1 in which the incident surface 1a is formed contact the non-emitting portions covered by the rubber blocks 4. Accordingly, the light irradiated from the fluorescent lamp 2 is not incident on the corner portions of the light guide plate 1.

Referring now to FIG. 11, light incident on the light guide plate 1 does not expand beyond an angle $\theta$ of a specified degree or more from a perpendicular to the incident surface 1a due to a difference of refractive indexes of air and the light guide plate 1. This angle is determined by a material constituting the light guide plate 1. In the case of the above-described polymethylmethacrylate, the angle $\theta$ is 42 degrees. Accordingly, the light incident from the incident surface 1a does not reach the left (or right) corner portion of the light guide plate 1, which is shown by hatching. Actually, the corner portion is not completely dark since some light is diffused and reflected in the light guide plate 1 to enter the corner portion. However, the portion shown by hatching is relatively dark compared with the other portion, thus producing an unevenness in brightness.

Various technologies for solving the above-described unevenness in brightness have been heretofore proposed. For example, technologies addressed to this problem are disclosed in the gazettes of Japanese Patent Laid-Open Nos. Sho 63 (1988)-33702 (Japanese Patent Publication No. Hei 7 (1995)-107567), Hei 6 (1994)-317796 and Hei 9 (1997)-231822.

In the technology disclosed in the gazette of Japanese Patent Laid-Open No. Sho 63 (1988)-33702, light incident on a central portion of the incident surface is reflected to the end portions in the width direction of the light guide plate by providing a critical angle reflection portion on the incident surface of the light guide plate.

The gazette of Japanese Patent Laid-Open No. Hei 6 (1994)-317796 proposes to provide a dot-shaped diffuse reflection layer on a surface (reflection surface) opposite the light-emitting surface of the light guide plate. This technology aims to supply the light incident on the light guide plate to the corner portion after being subjected to diffuse reflection on the diffuse reflection layer.

The gazette of Japanese Patent Laid-Open No. Hei 9 (1997)-231822 proposes a technology in which an illumination light introducing unit is placed between the fluorescent lamp and the light guide plate. The illumination light of the light source is expanded to an end portion side of the light source by the illumination light introducing portion to be guided to the light guide plate.

An additional requirement for liquid crystal display devices for portable equipment, such as notebook type personal computers, is narrowing of the picture frame. The picture frame is the peripheral non-image display region surrounding the image display region in the liquid crystal display panel. When the liquid crystal display device is miniaturized, if the area of the picture frame remains the same, the image area of the liquid crystal display region is reduced. In this event, the value of miniaturization is also reduced. If the area of the picture frame is reduced, the consequent reduction in the non-image display region permits the achievement of a larger image display region within a reduced overall dimension.

The above-described shortage of light at the corner portion of the light guide plate was not a great problem before the demand for a narrower picture frame. However, now that the picture frame must be narrower and the image quality must be improved, the problem of the shortage of light at the corner portions of the guide plate is now a serious problem.

Referring now to FIG. 12, a light guide late 1 has an image display region A on which is stacked a picture frame B. The picture frame B is a typical wide picture frame. The portion of the light guide plate 1 that lacks brightness is shown by hatching. It will be noticed that the entire hatched area is in the non-image area covered by the wide picture frame B. Thus, brightness degradation in the hatched area is not of concern.

Referring to FIG. 13, a light guide plate 1 has an image display region A surrounded by a picture frame B. The picture frame B is a typical narrow picture frame. Because of the narrow picture frame B, some of the area which is lacking in light is exposed to view. The area with degraded light is shown by hatching. It will be noticed that the narrower picture frame B places some of the area of degraded light in the image display area A. Thus, the areas of the light guide plate 1 having degraded light becomes a problem with the narrower picture frame B. The uneven brightness in the image display area A adversely affects the brightness and uniformity of a displayed image.

The above-described technologies disclosed in the gazettes of Japanese Patent Laid-Open Nos. Sho 63 (1988)-33702 (Japanese Patent Publication No. Hei 7 (1995)-107567), Hei 6 (1994)-317796 and Hei 9 (1997)-231822 are respectively effective for solving the unevenness in brightness. However, as shown below, there is still room for further improvement.

In the technology disclosed in the gazette of Japanese Patent Laid-Open No. Sho 63 (1988)-33702, a critical angle reflection portion is provided on the incident surface of the light guide plate. Disclosed as a concrete aspect of the critical angle reflection portion is either a slit formed on the incident surface of the light guide plate or a material filled in the slit, which has a refractive index higher than that of the light guide plate. The light guide plate is typically made by injection molding requiring extremely strict control for forming the slit. It is not simple to form the slit with high accuracy, particularly on a current light guide plate having a thin plate thickness of about 2 to 3 mm. A method is conceivable, where a light guide plate having no slit formed thereon is obtained by injection molding, and thereafter, the slit is formed by a machine process. However, even in this case, it is not yet simple to form a desired slit with high accuracy. In addition, adding a machine process after injection molding adds to the manufacturing cost.

The technology disclosed in the gazette of Japanese Patent Laid-Open No. Hei 6 (1994)-317796 is effective in that a light diffuse reflection layer can be formed relatively simply, and is appreciated in that the quantity of light at the foregoing corner portion of the light guide plate is increased. However, according to examination of the inventors of the present invention, the quantity of light at the corner portion must be further increased in order to meet the recent demand for the higher image quality.

The technology disclosed in the gazette of Japanese Patent Laid-Open No. Hei 9 (1997)-231822 increases the quantity of light at the corner portions by adding an illumination light introducing portion between the fluorescent lamp and the light guide plate. However, the presence of the illumination light introducing portion increases the size of the side backlight unit. Accordingly, this technology cannot meet the demand for miniaturization of the liquid crystal display device, specifically, the demand for the picture frame narrowing.

OBJECTS AND SUMMARY OF THE INVENTION

In consideration of the foregoing problems, the object of the present invention is to provide a sidelight type light source device capable of solving the shortage of light at the corners of the light guide plate at low cost while meeting the demand for narrowing the picture frame.

Another object of the present invention is to provide a light guide plate for use in the sidelight type light source device described above.

Another object of the present invention is to provide an image display device capable of solving the unevenness in brightness due to the shortage of light at the corners of the display.

The present invention defines a gap between each of the rubber blocks 4 and the light guide plate 1. Specifically, a gap between the rubber block 4 and the light guide plate 1 enables the light from the fluorescent lamp 2 to be directly incident on the corner portion of the light guide 1. In order to define the gap between the rubber block 4 and the light guide plate 1, the fluorescent lamp 2 having the rubber blocks 4 thereon is spaced from the light guide plate 1. However, since such spacing results in enlarging of a size of the sidelight type light source device including the fluorescent lamp 2, the spacing is contrary to the desire for picture frame narrowing. Therefore, the inventors of the present invention define a gap between the rubber block 4 and the light guide plate 1 by appropriately modifying the shape of the incident surface 1a of the light guide plate 1. Thus, the light from the fluorescent lamp 2 is incident on the corner portion of the light guide plate 1. Such modification of the light guide plate in shape is performed while satisfying the demand for picture frame narrowing at a low cost.

Accordingly, the sidelight type light source device of the present invention is a sidelight type light source device, comprising: a light guide plate including an incident surface on which light irradiated from a light source is incident and a light-emitting surface for emitting the light incident on the incident surface therefrom, a stick-shaped light source including a light-emitting portion having a length shorter than a width dimension of the incident surface and non-light-emitting portions is located on both end portions of the light-emitting portion, the stick-shaped light source being disposed along the incident surface of the light guide plate. The sidelight type light source device is characterized in that the foregoing incident surface includes a first incident surface located on a central portion in a width direction of the incident surface and second incident surfaces located on both end portions in the width direction, the second incident surfaces being continuous with the first incident surface, and a light introducing route is provided between the non-light-emitting portions of the light source and the second incident surfaces.

According to the sidelight type light source device of the present invention, even in a light source having non-light-emitting portions because of the above-described rubber blocks 4 attached thereto, since the light introducing route is formed between the non-light-emitting portion and the second incident surface, the light from the light-emitting portion can pass through the light introducing route, and is incident on the second incident surface. The second incident surfaces are located in the vicinity of the end portions of the light guide plate, whereby the quantities of light at the concerned portions is increased.

In the sidelight type light source device of the present invention, the second incident surface can take various forms. The second incident surface is a slant surface slanting relative to the first incident surface. Slanting the second incident surface defines a gap between the light guide plate and the non-light-emitting portion without requiring a large spacing between the light source and the light guide plate. This gap constitutes the light introducing route. In order to form the second incident surface consisting of a slant surface, the corner portion of the light guide plate may be removed by any suitable process such as, for example, cutting, grinding, beginning with a rectangular light guide plate having a rectangular cross-section. The present invention does not limit a forming method thereof.

Moreover, in the sidelight type light source device of the present invention, where the second incident surface is slanted with respect to the first incident surface, it is desirable that the second incident surface be constituted of a non-mirror surface. Usually, the incident surface of the light guide plate includes a mirror surface. However, by forming the second incident surface as a non-mirror surface, an incident angle of light on the second incident surface is increased. This ensures that the quantity of light directly incident on the second incident surface is increased.

In a sidelight type light source device of the present invention, the foregoing second incident surfaces can also be formed on parts in the thickness direction of the light guide plate. For example, the second incident surface consisting of the foregoing slant surface may be formed across the entire region in the thickness direction of the light guide plate, that is, from the light-emitting surface to the reflection surface. The second incident surface may be formed only in a range having a specified height from the reflection surface. In this way, the area of the surface on which the light-emitting surface is formed is not reduced. Accordingly, a wider light-emitting surface is produced.

The present invention provides a sidelight type light source device, comprising: a light guide plate including at least one incident surface and a light-emitting surface for emitting light incident on the incident surface therefrom, a stick-shaped light source including a light-emitting portion with non-light-emitting portions at the ends of the stick-shaped light source. The stick-shaped light source is disposed along the incident surface of the light guide plate. The incident surface includes a first incident surface facing the light-emitting portion of the light source and second incident surfaces facing the non-light-emitting portions of the light source. The second incident surfaces are set back from the first incident surface taken as a reference in an incident direction of light from the light source.

According to the sidelight type light source device of the present invention, since the second incident surfaces are set back from the first incident surface taken as a reference in the incident direction of the light from the light source, the light from the light-emitting portion of the light source can reach the second incident surfaces as well. Accordingly, the sidelight type light source device of the present invention contributes to the prevention of uneven brightness, especially in the corners of the light guide plate.

In the present invention, while the incident surface is formed on the entire region in the width direction of the light guide plate, the incident surface is also formed on a specified range excluding the end portions in the width direction. For example, a form corresponds thereto, where concave portions thereof are formed adjacent to the ends. The surfaces of the concave portions are the second incident surfaces. According to the form, since the second incident surfaces are formed, the light incident thereon is securely made incident on the light guide plate without diverting light from the light guide plate.

The present invention provides an image display device, to which the above-described sidelight type light source device of the present invention is applied. Specifically, the image display device of the present invention is an image display device, comprising: an image display panel including an image display region and a non-image display region surrounding the image display region; and a backlight unit for irradiating the image display panel. The foregoing backlight unit is disposed on a back surface of the image display panel. The foregoing backlight unit includes a light guide plate having incident surfaces on which light irradiated from a light source is incident and a light-emitting surface for emitting the light incident on the incident surfaces therefrom. The light source has a light-emitting portion with non-light-emitting portions located on the ends of the light-emitting portion. The foregoing light source is disposed along the incident surfaces of the light guide plate. A light introducing route is defined between the non-light-emitting portions of the light source and the incident surface facing the non-light-emitting portions.

In the image display device of the present invention, the foregoing incident surface includes a first incident surface located on a central portion in a width direction of the incident surface and second incident surfaces located on the end portions in the width direction. The foregoing second incident surfaces are continuous with the first incident surface. The second incident surfaces are set back from the first incident surface taken as a reference in an incident direction of light from the light source. This forms the light introducing route.

Since the light introducing route is a gap defined between the light source and the light guide plate, the light introducing route does not constitute the light-emitting surface. If the light introducing route is located within an area corresponding to the image display region of the image display panel, the quantity of light of that portion of an image is significantly reduced. Accordingly, it is desirable that the light introducing route be located within the area corresponding to the non-image display region of the image display panel.

As a concrete application example of the image display device of the present invention, a liquid crystal display device is cited. However, one skilled in the art will recognize that the present invention can also be applied to other types of image display devices without departing from the spirit and scope of the invention.

The present invention also provides a light guide plate for use in the sidelight type light source device and the image display device of the present invention, which have been described above.

Specifically, the light guide plate of the present invention comprises: an incident surface upon which light irradiated from a light source is incident. A light-emitting surface emits light therefrom that is incident on the incident surface. A reflection surface reflects light incident on the incident surface toward the light-emitting surface. The foregoing reflection surface is opposite the light-emitting surface. The foregoing incident surface includes a first incident surface located on a central portion in a width direction of the incident surface, and a second incident surface set back from the first incident surface taken as a reference in an incident direction of the light from the light source. The second incident surface is a non-mirror surface.

In the light guide plate of the present invention, the foregoing second incident surface is formed in a specified range from the reflection surface in a thickness direction of the light guide plate. Moreover, the second incident surface may also be formed as a slant surface extending from a corner portion of the incident surface side of the light-emitting surface toward the reflection surface.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
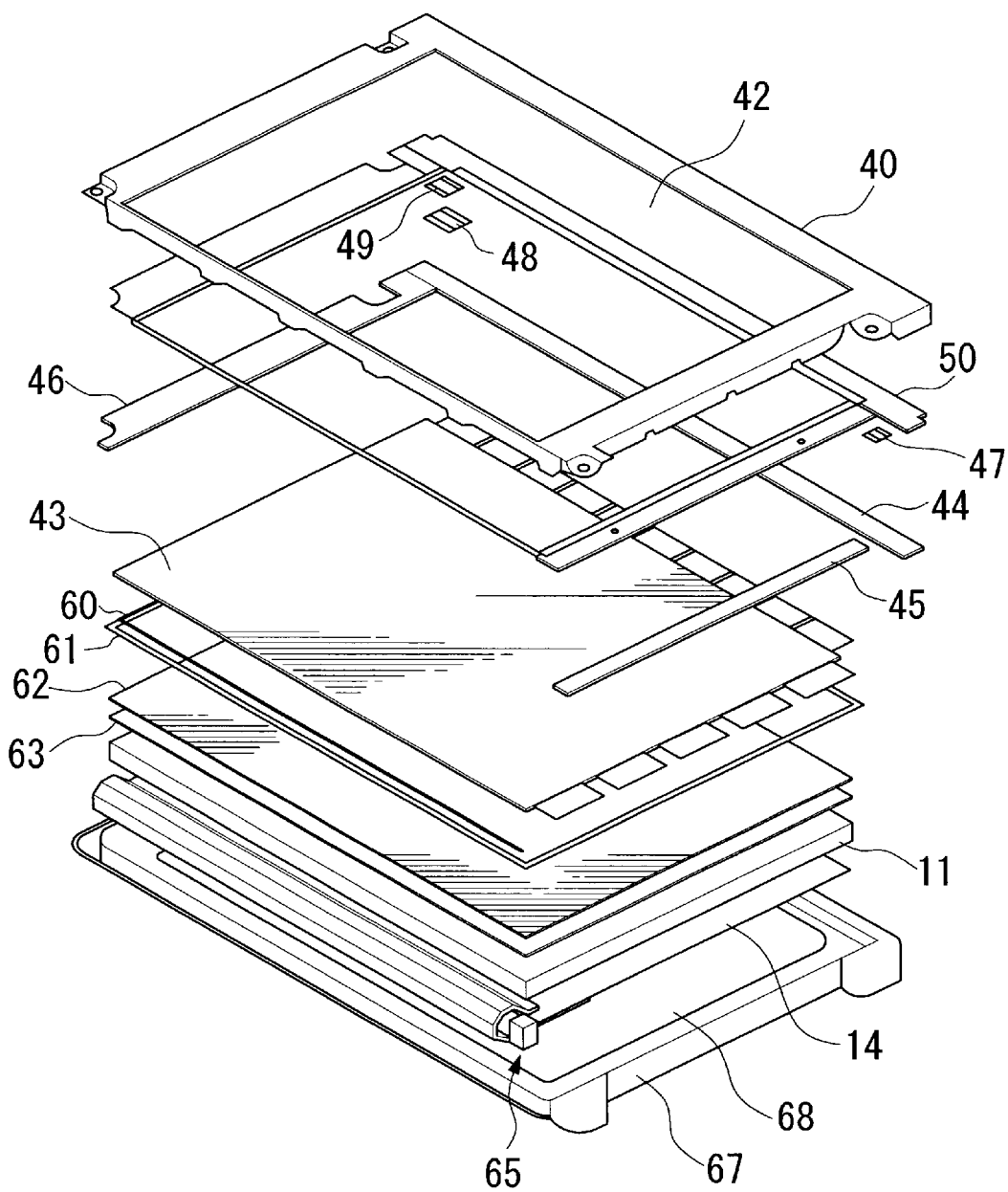
FIG. 1 is an exploded perspective view to which reference will be made in explaining the liquid crystal display device according to an embodiment of the present invention.

Referring to FIG. 1, an effective screen of a liquid crystal display device includes a metal shield 40 which forms an upper frame of a display window 42. A liquid crystal display panel 43 is of a conventional type in which a TFT having source/drain electrodes, a gate electrode, an amorphous silicon layer and the like deposited thereon, a color filter and the like is stacked between two glass substrates. A drain circuit board 44 is stacked along one edge of the liquid crystal display panel 43. A gate circuit board 45 is stacked along a second edge of the liquid crystal display panel 43. The drain circuit board 45 is connected to the gate circuit board 45 by a joiner 47. An interface circuit board 46 is disposed along a third edge of the liquid crystal display panel 43. Joiners 48 and 49 connect the drain circuit board 44 and the interface circuit board 46. An insulating sheet 50 is interposed between the circuit boards 44, 45 and 46 and the shield case 40.

A light shielding spacer 61 is stacked below the liquid crystal display panel 43. A rubber cushion 60 is interposed between the light shielding spacer 61 and the liquid crystal display panel 43. A diffusion plate 62 and a prism sheet 63 are stacked in that order below the light shielding spacer 61. The diffusion plate 62 diffuses light from a light guide plate to be described later in order to obtain a more uniform light. The prism sheet 63 increases brightness in the forward direction.

A light guide plate 11 is positioned under the prism sheet 63. A fluorescent lamp unit 65 is disposed along one edge of the light guide plate 11. Alternatively, fluorescent lamp units 65 may be provided along two sides of the light guide plate 11. A reflection plate 14, under the light guide plate 11, reflects light incident thereon from the fluorescent lamp unit 65 toward the liquid crystal display panel 43. A lower case 67, having an opening 68, closes the lower portion of the assembly.

Figure 2:
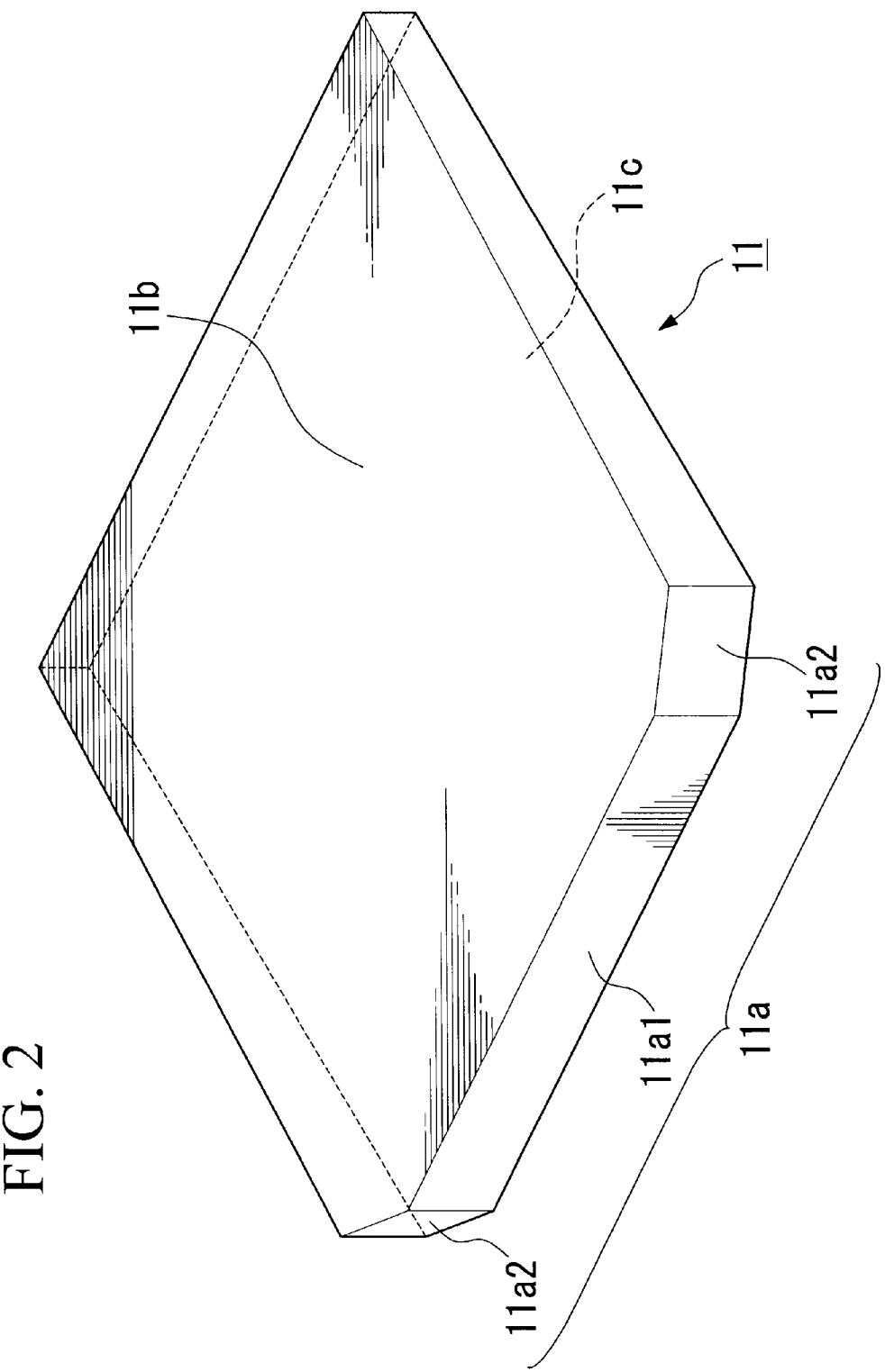
FIG. 2 is a perspective view showing a light guide plate in this embodiment.

Referring now to FIG. 2, the light guide plate 11 is made of an acrylic resin having a thickness of about 2 to 3 mm. The acrylic resin may be, for example, polymethylmethacrylate. An incident surface 11a on the light guide plate 11 receives light from the fluorescent lamp unit 65. A light-emitting surface 11b emits the light entering through the incident surface 11a upward toward the liquid crystal display panel 43. A reflection surface 11c is coated the surface of the light guide plate 11 opposite from the light-emitting surface 11b.

The incident surface 11a is divided into three surfaces. A first incident surface 11a1 is located on a central portion in the width direction of the incident surface 11a. Each end of the incident surface 11a includes a second incident surface 11a2 continuous with the first incident surface 11a. The second incident surfaces 11a2 are slanted relative to the first incident surface 11a1. With this construction, the second incident surfaces 11a2 are set back from the plane defined by the first incident surface 11a1 in the light incident direction.

Figure 3:
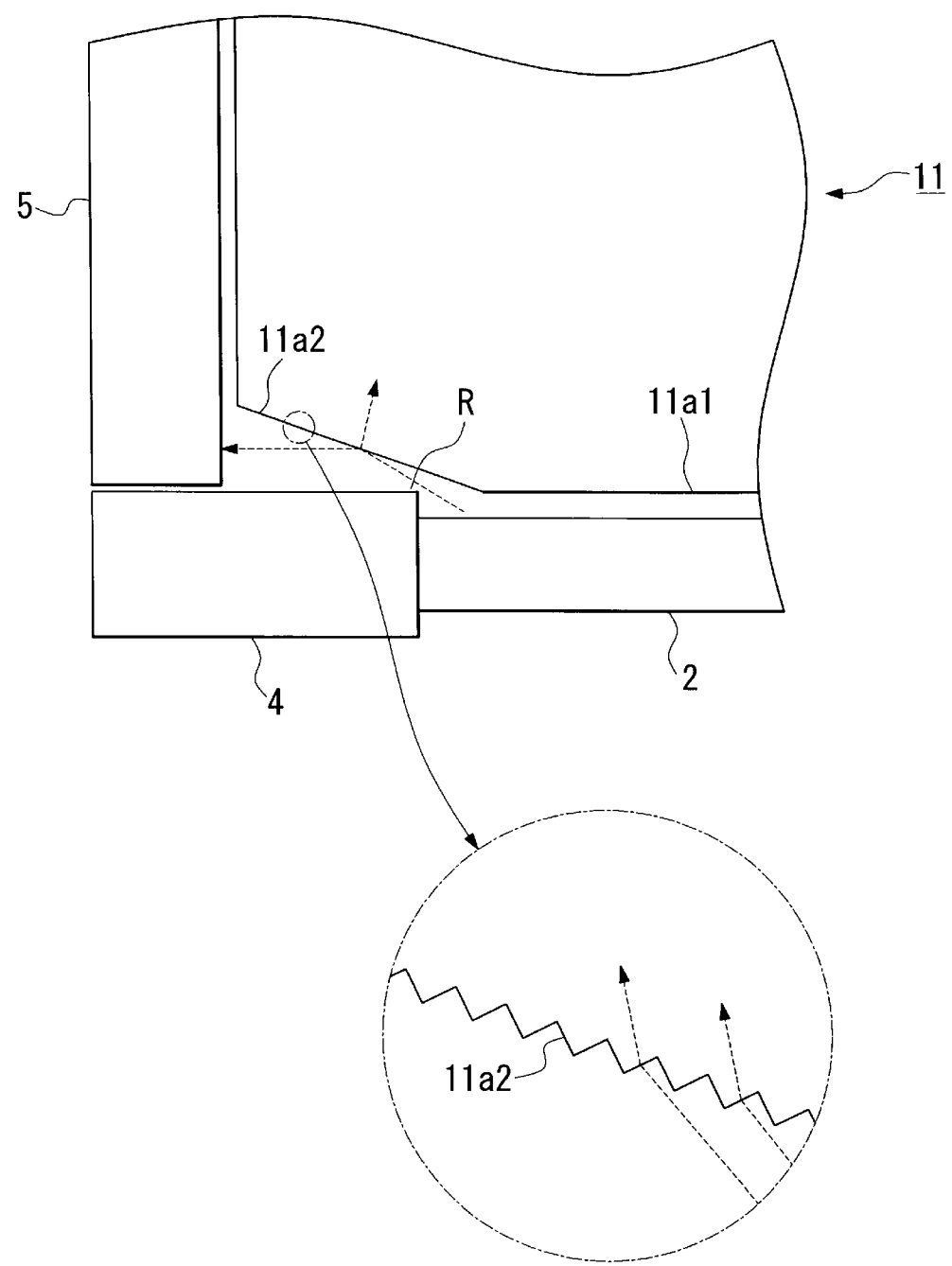
FIG. 3 is a plan view of a sidelight type light source device according to this embodiment.

Referring now to FIG. 3, the fluorescent lamp unit 65 includes the fluorescent lamp 2 and the rubber block 4. Frames 5 are disposed at both sides of the light guide plate 11 (only one side is shown). The first incident surface 11a1 faces the light-emitting portion of the fluorescent lamp 2. Most of the second incident surface 11a2 faces a non-light-emitting portion covered with the rubber block 4.

Since the second incident surface 11a2 is set back from the first incident surface 11a1 taken as a reference, a light introducing route R is formed between the second incident surface 11a2 and the rubber block 4. The light introducing route R is located on an area corresponding to the non-image display region of the liquid crystal display device. As shown by arrow lines in FIG. 3, the light from the fluorescent lamp 2, passing through the light introducing route R, is incident on the second incident surface 11a2 of the light guide plate 11. This increases the quantity of light at the corner portion as compared with the prior art.

Part of the light incident on the second incident surface 11a2 is reflected from the second incident surface 11a2 to an inner surface of the frame 5. This effect is strongest with a small incident angle of light on the second incident surface 11a2 is small. Conventionally, the light guide plate 11 including the incident surface 11a is finished to a mirror surface. In order to increase the light incident angle, the second incident surface 11a2 receives a non-mirror surface. The non-mirror surface is formed by producing tiny inequalities in the surface. By normal optical principles, the light entering the light guide plate 11 through the second incident surface 11a2 is bent as shown. This increases the quantity of light entering the light guide plate 11 through the second incident surface 11a2.

The light guide plate 11 including the incident surface 11a, consisting of the first incident surface 11a1 and the second incident surfaces 11a2, can be manufactured directly by injection molding, using of a die having a cavity shaped to form the incident surface 11a. The surface of the die may be textured to produce non-mirror surfaces on the second incident surfaces 11a2. Alternatively, a blank light guide plate 11 may be formed with the entire incident surface 11a consisting of a single plane. Then the blank is machined by cutting and/or grinding to form the second incident surfaces 11a2. Such a machining process typically leaves the surface roughened into a non-mirror surface, as is desired for the second incident surfaces 11a2. Thus, further processing of the second incident surfaces 11a2 may be omitted.

Figure 4:
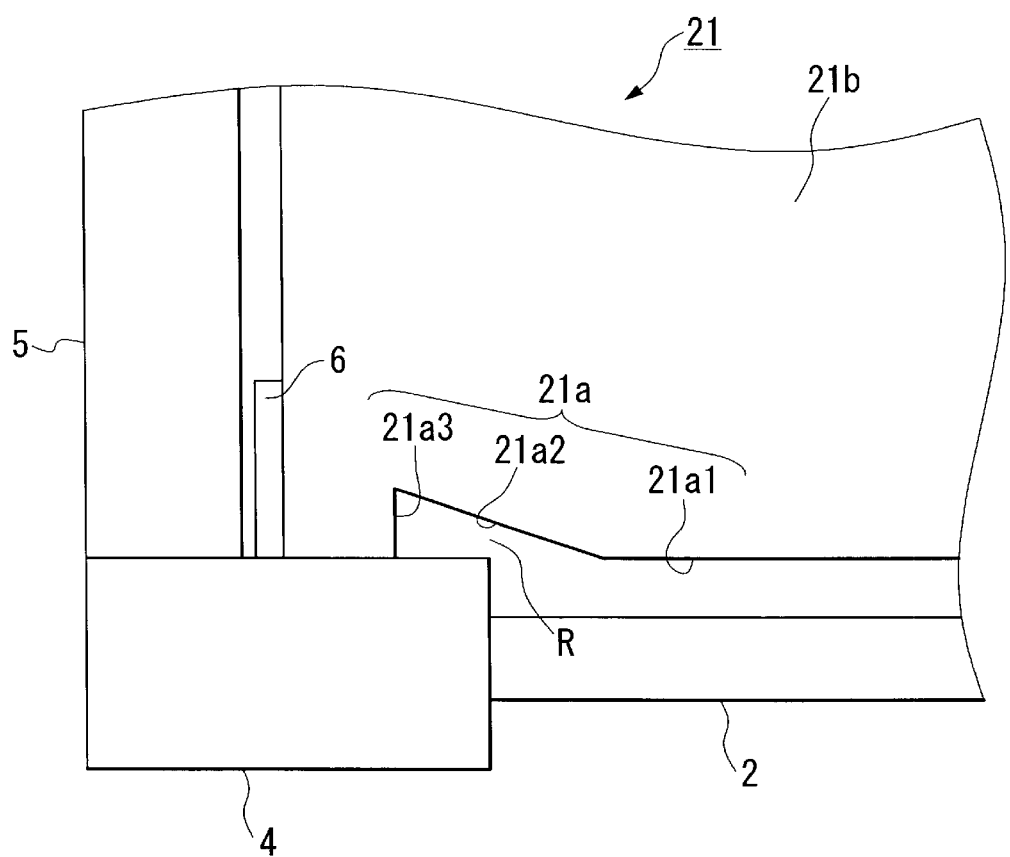
FIG. 4 is a plan view showing another example of the sidelight type light source device according to this embodiment.
Figure 5:
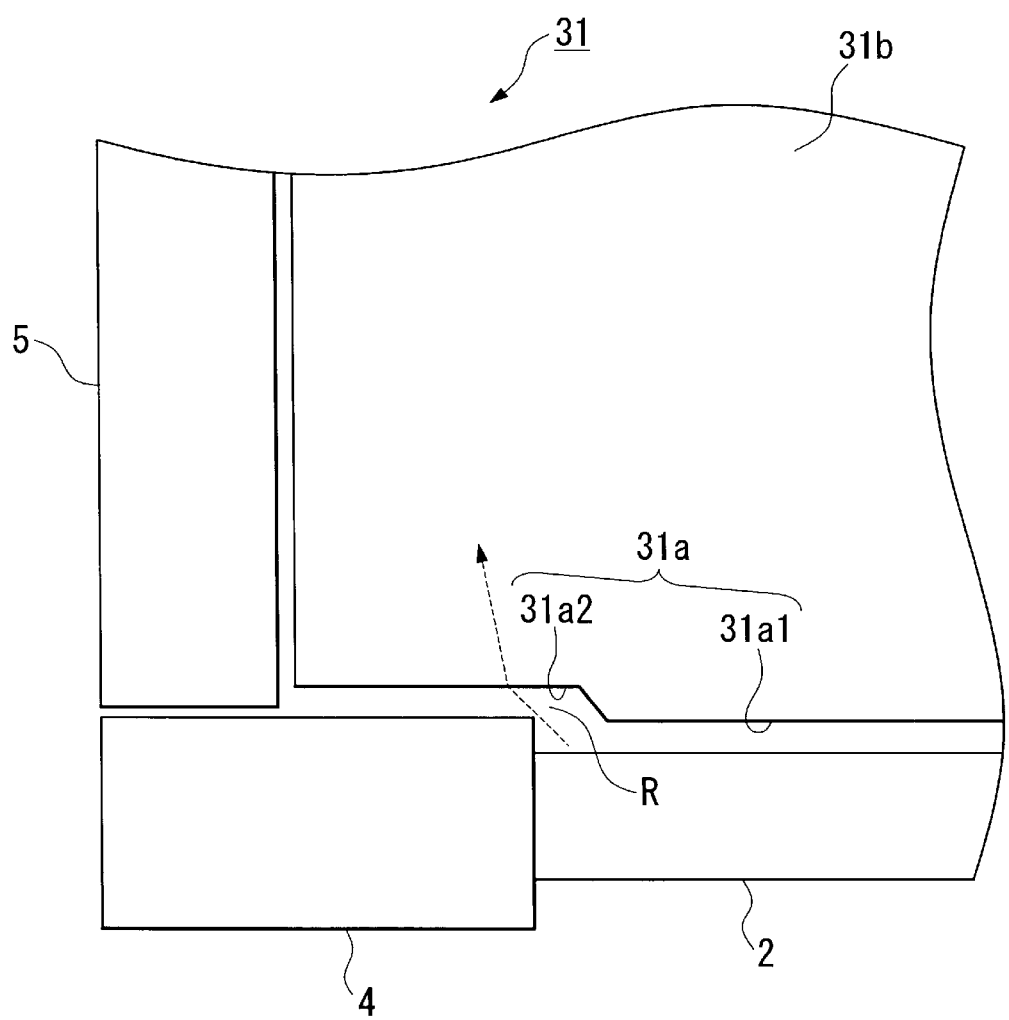
FIG. 5 is a plan view showing still another example of a sidelight type light source device according to this embodiment.
Figure 6:
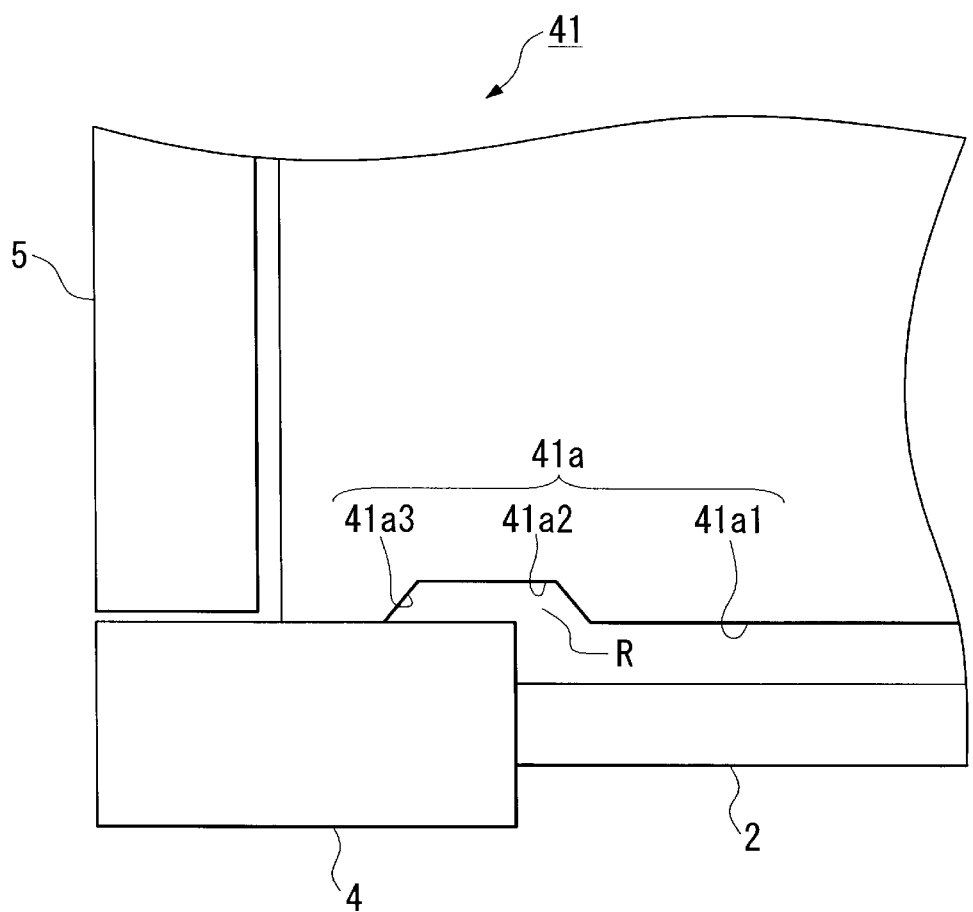
FIG. 6 is a plan view showing yet another example of a sidelight type light source device according to this embodiment.

FIGS. 4 to 6 show modifications of the light guide plate 11 of FIGS. 2 and 3.

Referring now to FIG. 4, a light guide plate 21 4 includes an incident surface 21a for receiving light from the fluorescent lamp 2. A light-emitting surface 21b emits the light toward the remainder of the device. The light guide plate 21 is similar to the light guide plate 11 of FIGS. 2 and 3 in that the incident surface 21a includes a first incident surface 21a1 at its central portion in the width direction and second incident surfaces 21a2 continuous at the ends of the first incident surface 21a1.

The light guide plate 21 is different from the light guide plate 11 in that the light guide plate 21 has a slant surface as the second incident surface 21a2 interrupted at a specified position, while the second incident surface 11a2 of the light guide plate 11 is a single slant surface to the end of the light guide plate 11 in the width direction. Specifically, it can be said that the light guide plate 21 includes concave portions spaced a predetermined distance from the peripheries in the width direction of the light guide plate 21. The light introducing route R is formed between the rubber block 4 and the second incident surface 21a2. Light is incident on the second incident surface 21a2 via the light introducing route R. Moreover, the light that passed through the light introducing route R is incident on a third incident surface 21a3, as well as on the second incident surface 21a2. In the case of the embodiment of FIG. 3, light reflected from the second incident surface 11a2 is irradiated on the frame 5. In the embodiment of FIG. 4, light passing directly along the light introducing route R, which fails to enter the second incident surface 21a2, or which is reflected from the second incident surface 21a2, is incident on the third incident surface 21a3. Thus, the presence of the third incident surface 21a3 guarantees that all light entering through the light introducing route R is incident on the light guide plate 21 without fail.

A reflection layer 6 is disposed on the outer surface of the light guide plate 21 generally behind the third incident surface 21a3. Light entering the third incident surface 21a3, which passes through to the outer perimeter of the light guide plate 21 is reflected back into the light guide plate 21, whereby substantially all of the light entering the third incident surface 21a3 is effective to brighten the corner of the display. The reflection layer 6 may be formed by any convenient method. In the preferred embodiment, a white tape is applied to the side of the light guide plate 21. Alternatively, a coating of white paint may be used.

The embodiment of FIG. 4 has the advantage that the third incident surface 31a3 forms a leg, the end of which is coplanar with first incident surface 21a2. The end of this leg rests on the rubber block 4 to fix the alignment of the light guide plate 21 with respect to the fluorescent lamp 2.

Referring now to FIG. 5, a further embodiment of the invention includes a light guide plate 31 having an incident surface 31a for receiving the light from the fluorescent lamp 2, incident thereon and a light-emitting surface 31b for emitting the light incident on the incident surface 31a to the outside. The light guide plate 31 is similar to the light guide plate 11 shown in FIGS. 2 and 3 in that the incident surface 31a includes a first incident surface 31a1, located at the central portion in the width direction of the incident surface 31a, and second incident surfaces 31a2 continuous with the first incident surface 31a1.

The light guide plate 31 is different from the light guide plate 11 in that the light guide plate 31 because its second incident surface 31a2 is parallel to the first incident surface 31a2. A step, preferably a slant surface, joins the ends of the first incident surface 31a1 and the second incident surface 31a2. The presence of the step spaces the second incident surface 31a2 inward of the first incident surface 31a1, thus forming the light introducing route R. The light introducing route R permits light from the fluorescent lamp 2 to enter the second incident surface 31a2.

The light guide plate 31 of this embodiment shown in FIG. 5 has the advantage that the incidence angle of the light incident on the second incident surface 31a2 is larger as compared with the light guide plate 11 shown in FIGS. 2 and 3.

Moreover, in the light guide plate 31 the second incident surface 31a2 does not require a third incident surface, as is the case of the embodiment of FIG. 4.

Referring now to FIG. 6, a further embodiment of the invention includes a light guide plate 41 in which a second incident surface 41a2 is continuous with a first incident surface 41a1. However, the second incident surface does not extend to periphery in the width direction of the light guide plate 41. A third incident surface 41a3 is formed at the end of the second incident surface 41a2. The light introducing route R is formed between the second incident surface 41a2 and the rubber block 4. Light that passed through the light introducing route R is incident on the third incident surface 41a3, as well as on the second incident surface 41a2. Accordingly, similarly to the light guide plate 21 shown in FIG. 4, the light guide plate 41 has an advantage that the light that passed through the light introducing route R is guaranteed to be incident on the light guide plate 41. In addition, the presence of the third incident surface 41a3 forms a leg which contacts the surface of the ruber block for aligning the light guide plate 41 with the fluorescent lamp 2.

Figure 7:
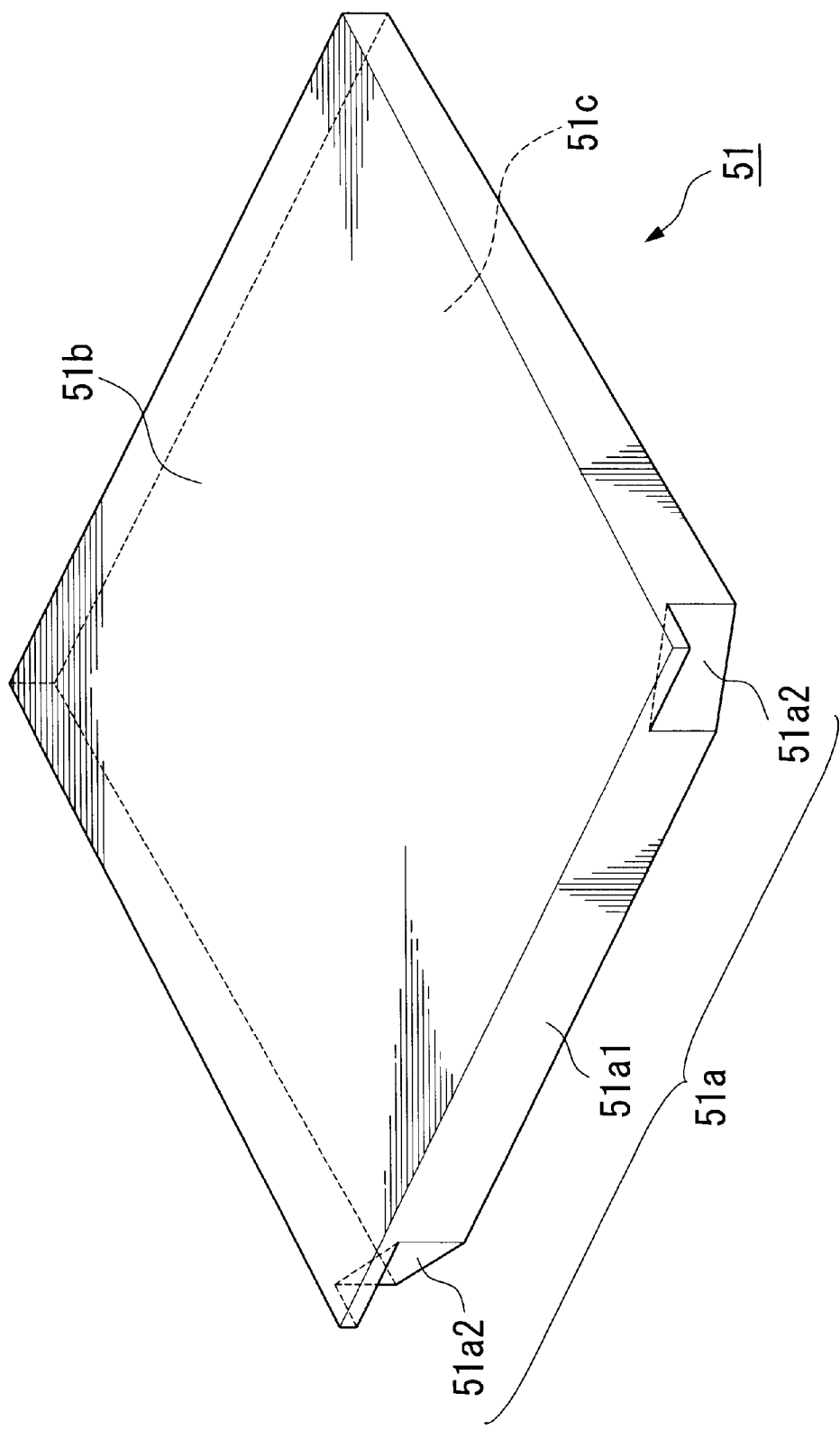
FIG. 7 is a perspective view showing another example of a light guide plate according to this embodiment.

Referring now to FIG. 7, another embodiment of a light guide plate 51 includes an incident surface 51a having a central first incident surface 51a1 and second incident surfaces 51a2 at the ends of the first incident surface. The second incident surfaces 51a2 occupy only a portion of the light guide plate 51 in the thickness direction. Portions of the light guide plate 51, between the second incident surfaces 51a2 and the light-emitting surface 51b in the thickness direction, remain. The portions of the light guide plate 51 adjacent the second incident surfaces 51a2, which are not removed, desirably increase the light-emitting area of the light-emitting surface 51b. That is, the light-emitting surface 51b remains a full rectangle.

In contrast to the embodiment of FIG. 7, the light guide plate 11 of FIG. 2 has the entire corner of the rectangle removed. Thus, the light-emitting surface 11b if FIG. 2 has less area than the light-emitting surface 51b of the embodiment of FIG. 7.

Figure 8:
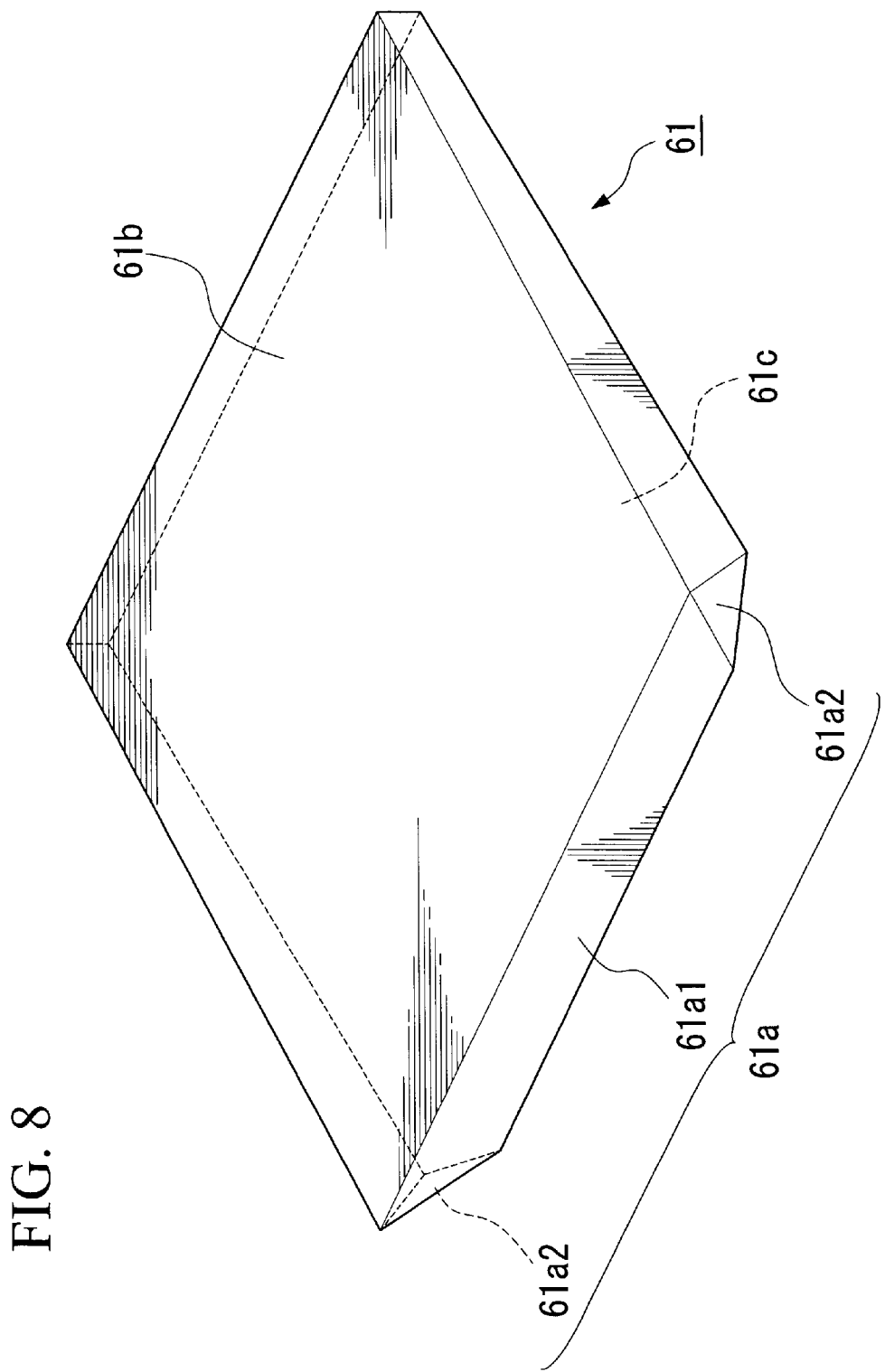
FIG. 8 is a perspective view showing still another example of a light guide plate according to this embodiment.
Figure 9:
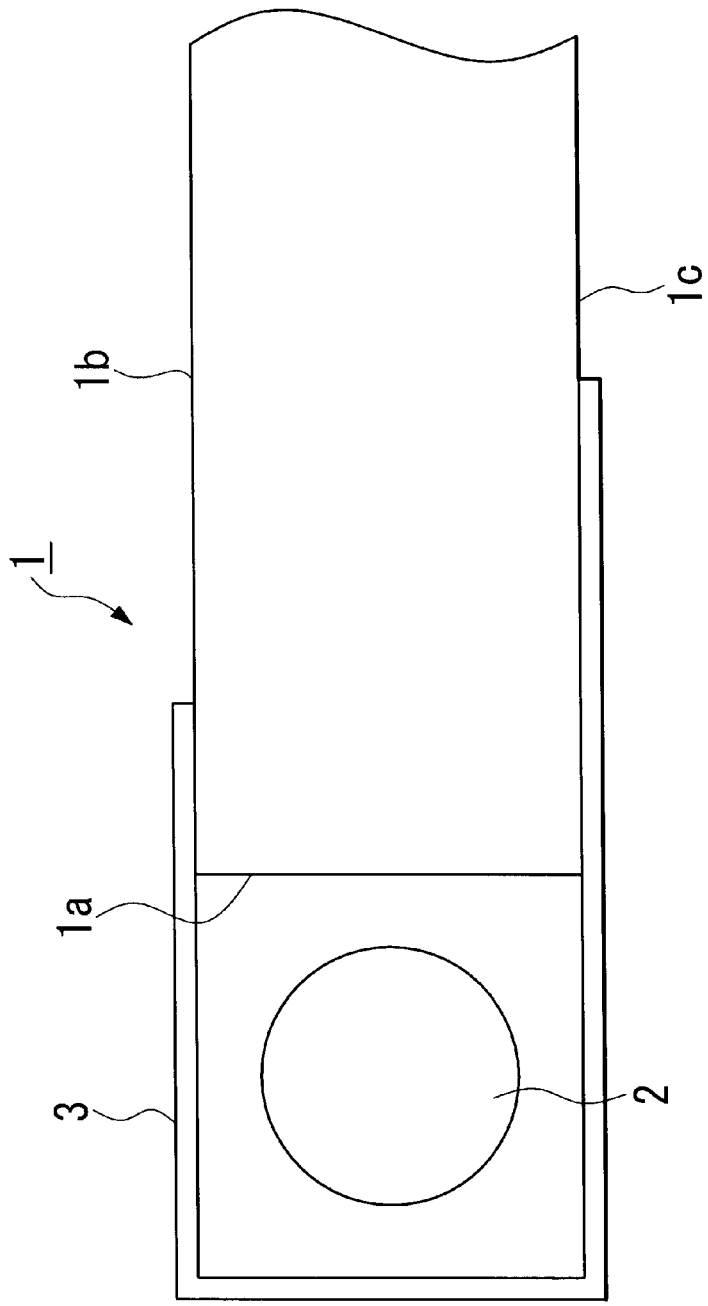
FIG. 9 is a cross-sectional view showing principal portions of a conventional sidelight type light source device.
Figure 10:
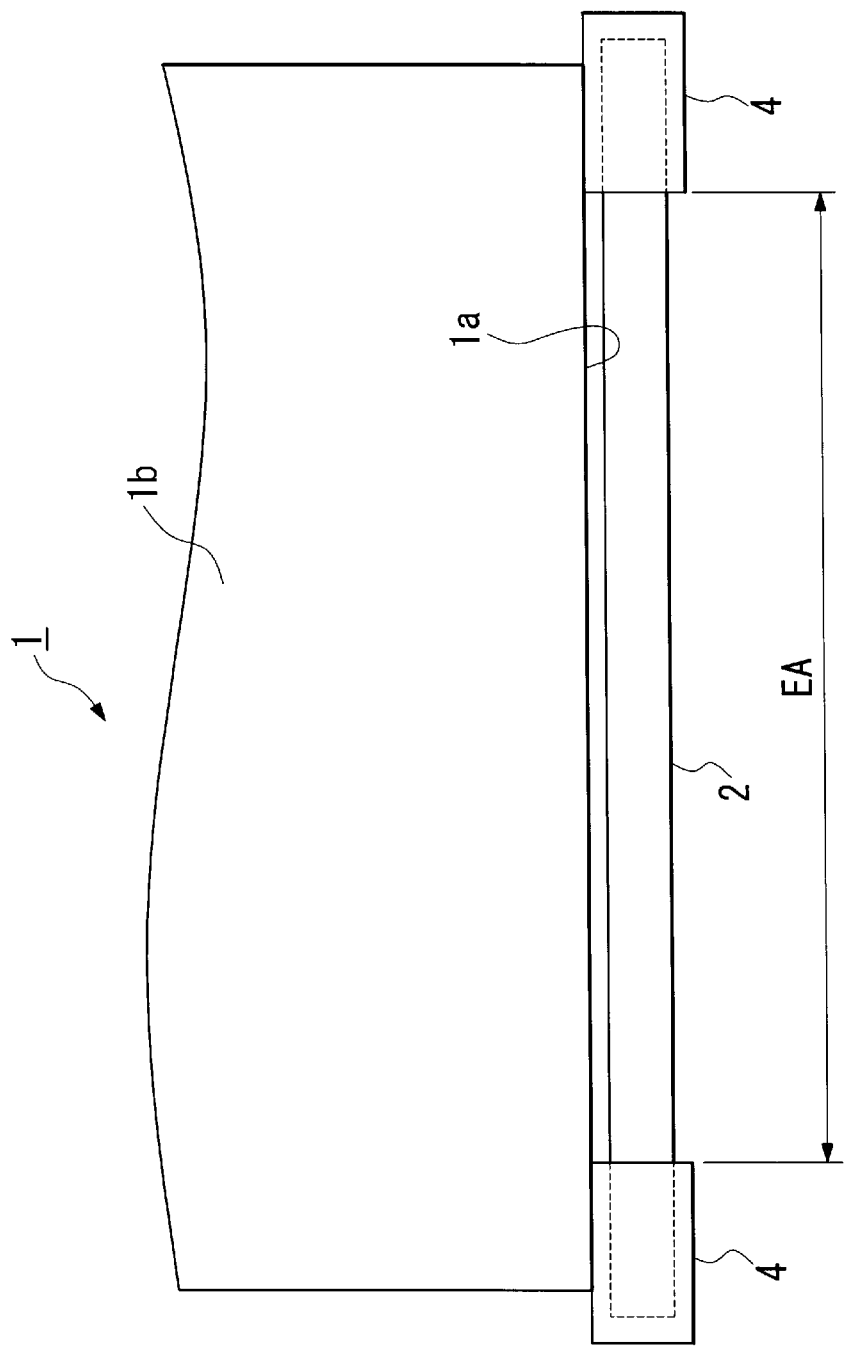
FIG. 10 is a plan view showing the principal portions of the conventional sidelight type light source device with the reflector removed in order to facilitate understanding.
Figure 11:
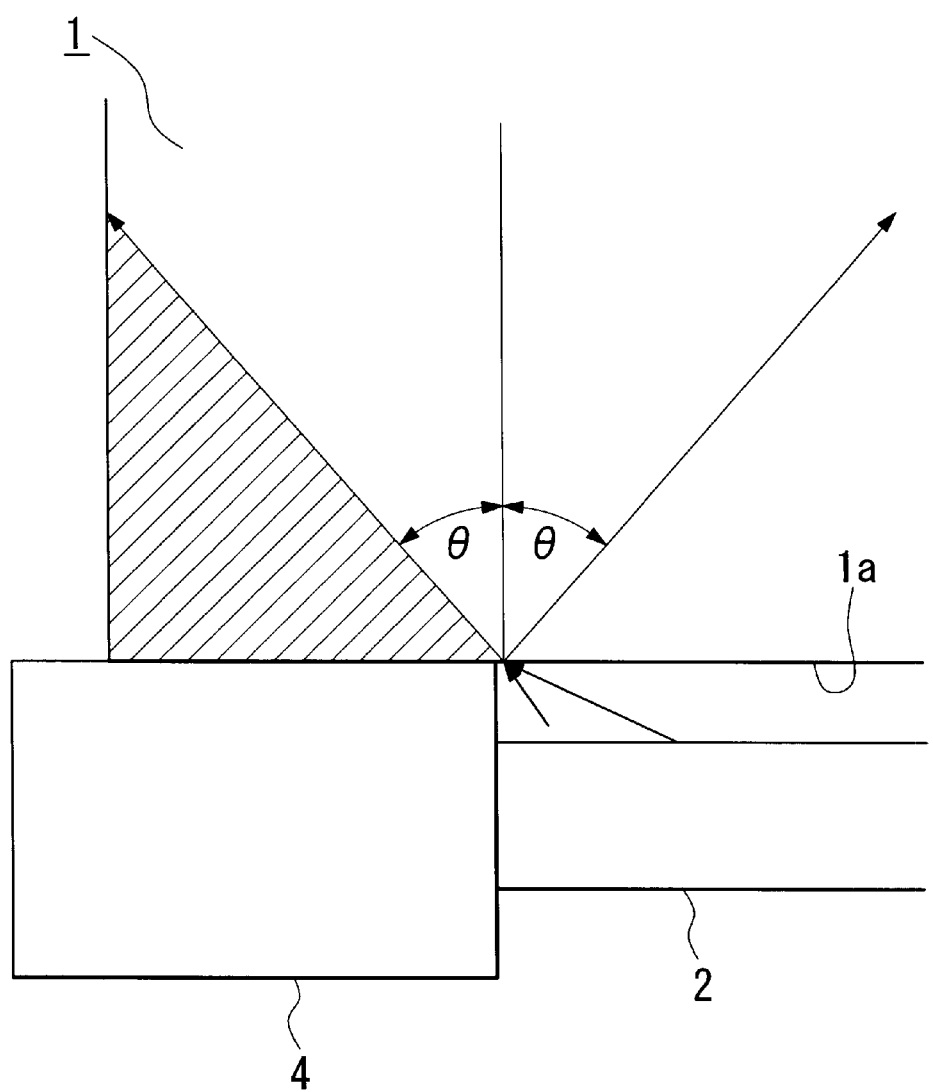
FIG. 11 is a view to which reference will be made in explaining an incident state of light at a corner portion of a light guide plate.
Figure 12:
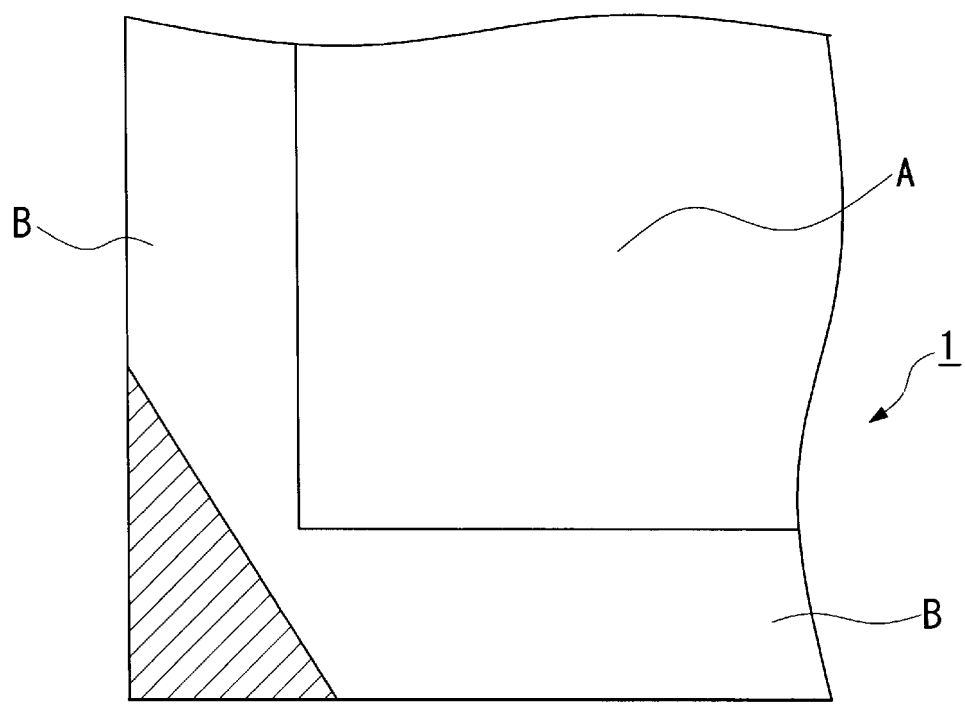
FIG. 12 is a view showing a relationship between a display region of a liquid crystal display panel and a corner portion of a light guide plate, in which a wide picture frame is used.
Figure 13:
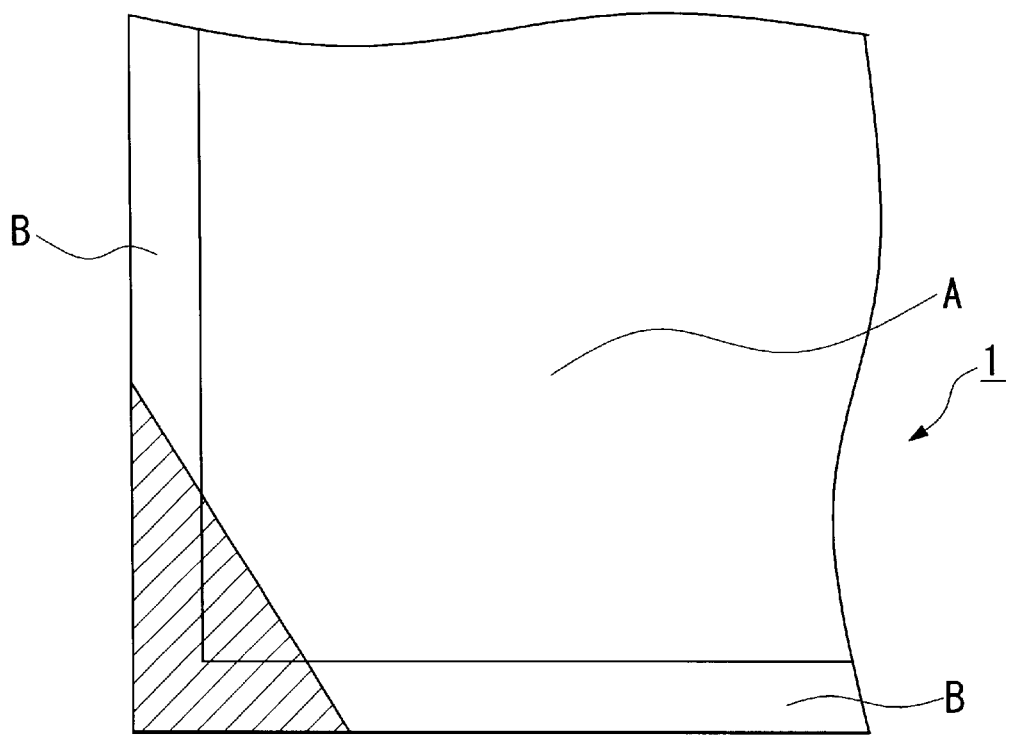
FIG. 13 is a view showing a relation between the display region of the liquid crystal display panel and the corner portion of the light guide plate in which a narrow picture frame is used.
Figure 14:
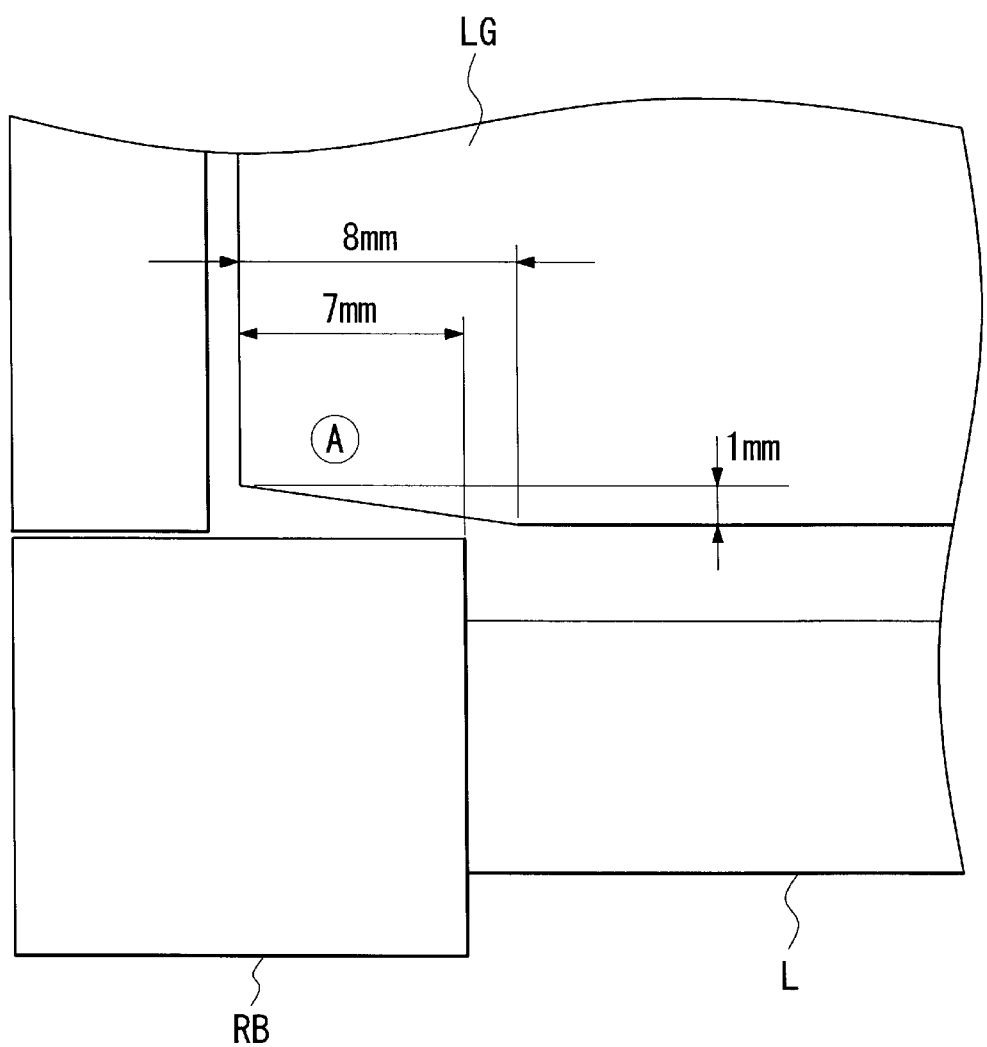
FIG. 14 is a view showing principal portions of a light source device for use in confirmation of an effect of the light guide plate according to this embodiment.

Referring now to FIG. 8, a light guide plate 61 includes an incident surface 61a consisting of a first incident surface 61a1 and second incident surfaces 61a2. In this embodiment, the second incident surfaces 61a2 are slant surfaces formed from corner portions of a surface forming the light-emitting surface 61b to a reflection surface 61c. That is, the light-emitting surface 61b remains a full rectangle. Since the light-emitting surface 61b remains a full rectangle, the area of the light-emitting surface 61b is maximized. The slant surfaces forming the second incident surfaces 61a2 may not extend fully from the reflection surface 61c to the light-emitting surface 61b. Applications may be desired in which the slant surface removes a corner of the light-emitting surface 61b, or which ends a distance away from the corner of the light-emitting surface 61b in the thickness dimension. Referring now to FIG. 14, the brightness in a light guide plate LG was measured. The shape and dimensions of the light guide plate LG are as shown in the drawing. The rubber block is indicated by RB, and the fluorescent lame is indicated by L. A light guide plate of the present invention, having the shape and dimensions of FIG. 14, was used in the measurement. Measurement was made of the light emitted along a line shown by a reference code A. The same measurement for brightness was performed on a prior art light guide plate shown in FIG. 10 for comparison. The results are as described below. It is seen that relative brightness is increased by 10% by the light guide plate of the present invention, compared to a light guide plate of the prior art.

A light guide plate of the present invention: 1642 (nit).
A conventional light guide plate: 1467 (nit).

Figure 15:
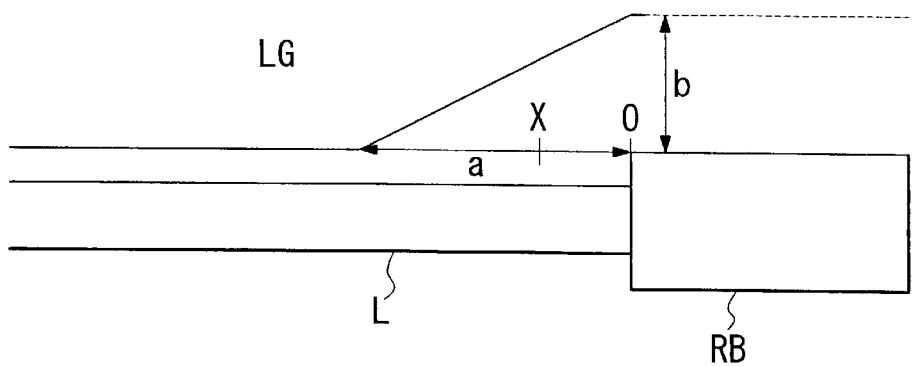
FIG. 15 is a view to which reference will be made in explaining simulation conditions in this embodiment.

The quantity of light emitted from the light guide plate LG and the contrast thereof were determined by simulation as changing dimensions of a and b as shown in FIG. 15.

Figure 16:
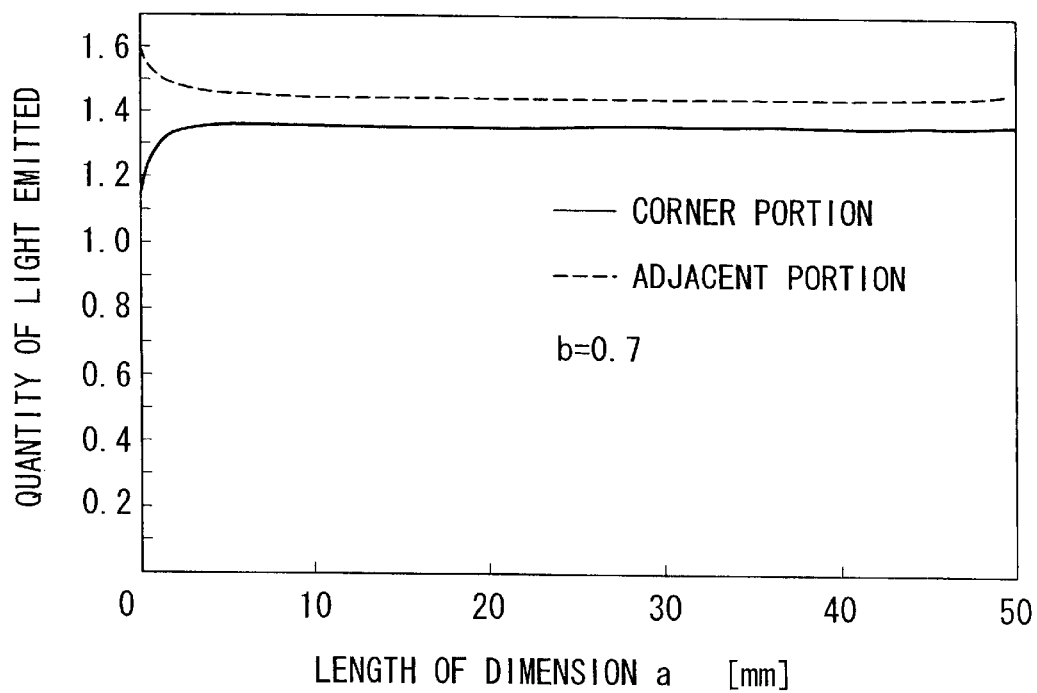
FIG. 16 is a graph showing results obtained by simulating variation of the quantity of light emitted from a corner portion of a light guide plate LG and a spot adjacent thereto (adjacent portion).

FIG. 16 is a graph showing variation of the quantities of light emitted on a corner portion of the light guide plate LG and a portion adjacent to the corner portion (the adjacent portion) when a length of 'a' is changed. Note that the quantity of light emitted is a relative quantity of light emitted taking the quantity of light on the corner portion as 1 where 'a' is zero. The dimension b is fixed at 0.7 mm.

As shown in FIG. 16, the quantity of light emitted from the corner portion increases as the 'a' value increases from zero. The quantity of light emitted is saturated at the 'a' value in the range from 5 to 10 mm. In the adjacent portion, the quantity of light emitted therefrom is reduced as the 'a' value increases from zero. This is assumed to attributable to a part of the light that would otherwise be emitted from the adjacent portion is instead emitted from the corner portion in the case where 'a' is zero.

In terms of a characteristic of the display screen, it is desirable that a difference between the quantity of light emitted from the corner portion and the quantity of light emitted from the adjacent portion be small. In FIG. 16, the difference between the quantity of light emitted from the corner portion and the quantity of light emitted from the adjacent portion is maximum when 'a' is zero. As the 'a' value is increased, the difference is decreased. The difference is reduced to about ⅓ of that when 'a' is zero.

Figure 17:
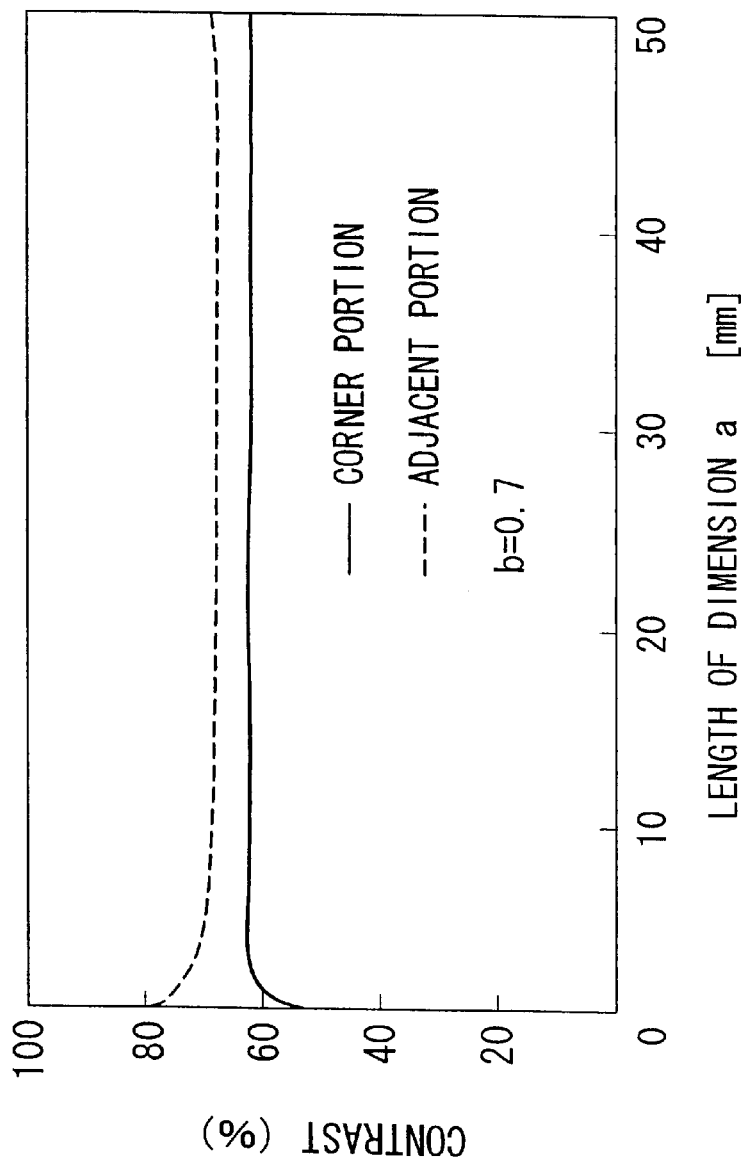
FIG. 17 is a graph showing results obtained by simulating variation of contrasts of light on the corner portions of the light guide plate LG and the spot adjacent thereto (adjacent portion).

FIG. 17 is a graph showing variation of the contrasts of the corner portion of the light guide plate LG and the portion adjacent to the corner portion (the adjacent portion) when the length of 'a' is changed. FIG. 17 shows that the contrast follows the tendency of the emitted quantities of light of FIG. 16. From FIG. 17, it is seen that, while a difference between the contrast at the corner portion and the contrast at the adjacent portion is about 30% when 'a' is zero, the difference is reduced to about 10% when 'a' exceeds about 5 mm.

From the above results, it seen that the presence the dimension "a" is desirable in terms of the quantity of light emitted and the contrast. However, the effect is saturated when the 'a' value exceeds a specified value. Accordingly, 'a' value is determined in consideration of the above saturation.

With regard to the b value, it is found that 0.7 mm is sufficient to contribute to the improvement of the quantity of light emitted on the corner portion. The b value must be no more than 1 mm in order to meet the demand for the picture frame narrowing. The above simulation confirms that a value of b less than 1 mm is satisfactory.

As described above, according to the present invention, a sidelight type light source device is provided capable of solving the problems of the prior art at low cost, in which the shortage of light at the corner portion of the display screen is alleviated while meeting the demand for narrowing the picture frame. Accordingly, the image quality of the image display device using the light source device, particularly the image quality at the corner portion is improved.

Although the preferred embodiment of the present invention has been described in detail, it should be understood that various changes, substitutions and alternations can be made therein without departing from spirit and scope of the inventions as defined by the appended claims.

What is claimed is:
1. A sidelight type light source device, comprising:
    a light guide plate;
    an incident surface on said light guide plate for receiving light directly from a stick-shaped light source;
    a light-emitting surface on said light guide plate for emitting the light incident on said incident surface therefrom;

a stick-shaped light source;

said stick-shaped light source including a light-emitting portion having a length shorter than a width dimension of said incident surface and non-light-emitting r portions at ends of said light-emitting portion;

said stick-shaped light source being disposed along said incident surface of said light guide plate, said incident surface includes a first incident surface on a central portion in a width direction of said incident surface and second incident surfaces located on opposed ends of said first incident surface in said width direction, said second incident surfaces being continuous with said first incident surface; and a light introducing route between said non-light-emitting portions of said stick-shaped light source and said second incident surfaces such that light emitted from said stick-shaped light source directly illuminates said second incident surfaces.

2. The sidelight type light source device according to claim 1, wherein said second incident surfaces are slanted relative to said first incident surface.

3. The sidelight type light source device according to claim 2, wherein said second incident surfaces are non-mirror surfaces.

4. The sidelight type light source device according to claim 1, wherein said second incident surfaces are formed in a thickness direction of said light guide plate.

5. A sidelight type light source device, comprising:

a light guide plate;

said light guide plate including at least one incident surface and a light-emitting surface for emitting light directly incident on said incident surface therefrom;

a stick-shaped light source;

said stick-shaped light source including a light-emitting portion and non-light-emitting portions located on opposed ends of said light-emitting portion;

said stick-shaped light source being disposed along said incident surface of said light guide plate;

said incident surface including a first incident surface facing said light-emitting portion of said stick-shaped light source and second incident surfaces facing said non-light-emitting portions of said stick-shaped light source; and said second incident surfaces are set back from said first incident surface taken as a reference in an incident direction of light from said stick-shaped light source, whereby a light introducing route is created for light to reach said second incident surfaces directly.

6. The sidelight type light source device according to claim 5, wherein said incident surface is formed in a specified range in a width direction of said light guide plate.

7. An image display device, comprising:

an image display panel including an image display region and a non-image display region surrounding the image display region; and a backlight unit for irradiating said image display panel, said backlight unit being disposed on a back surface of said image display panel;

a light guide plate in said backlight unit;

said backlight unit having an incident surface on which light from a stick shaped light source is directly incident and a light-emitting surface for emitting said light from said light guide plate; and a stick-shaped light source having a light-emitting portion and non-light-emitting portions located on opposed end portions of the light-emitting portion;

said stick-shaped light source being disposed along said incident surface of said light guide plate; and a light introducing route between said non-light-emitting portions of said stick-shaped light source and said incident surface facing said non-light-emitting portions such that light emitted from said stick-shaped light source directly illuminates said incident surface.

8. The image display device according to claim 7, wherein said incident surface includes:

a first incident surface on a central portion in a width direction of said incident surface;

second incident surfaces located on opposed end portions of said incident surface in said width direction, said second incident surfaces being continuous with said first incident surface;

said second incident surfaces are set back from said first incident surface taken as a reference in an incident direction of light from said stick-shaped light source, thereby forming a light introducing route to said second incident surfaces.

9. The image display device according to claim 7, wherein said light introducing route is located within an area corresponding to said non-image display region of said image display panel.

10. A light guide plate, comprising:

an incident surface for directly receiving light from a stick-shaped light source;

a light-emitting surface for emitting the light incident on said incident surface therefrom;

a reflection surface for reflecting light incident on said incident surface toward said light-emitting surface, said reflection surface being opposite with said light-emitting surface;

said incident surface includes a first incident surface on a central portion in a width direction of said incident surface; and second incident surfaces;

said second incident surfaces being non-mirror surfaces;

said second incident surfaces being set back from said first incident surface taken as a reference in an incident direction of the light from said stick-shaped light source such that the light emitted from said stick-shaped light source directly illuminates said second incident surface.

11. The light guide plate according to claim 10, wherein said second incident surfaces are formed in a specified range from said reflection surface in a thickness direction of said light guide plate.

12. The light guide plate according to claim 10, wherein said second incident surfaces are slant surfaces formed from a corner portion of said incident surface side of said light-emitting surface toward said reflection surface.

* * * * *